United States Patent
Yamamoto

(10) Patent No.: US 11,522,254 B2
(45) Date of Patent: Dec. 6, 2022

(54) ENERGY STORAGE APPARATUS

(71) Applicant: Blue Energy Co., Ltd., Kyoto (JP)

(72) Inventor: Yuta Yamamoto, Kyoto (JP)

(73) Assignee: BLUE ENERGY CO., LTD., Kyoto (JP)

(*) Notice: Subject to any disclaimer, the term of this patent is extended or adjusted under 35 U.S.C. 154(b) by 296 days.

(21) Appl. No.: 16/757,711

(22) PCT Filed: Oct. 25, 2018

(86) PCT No.: PCT/JP2018/039618
§ 371 (c)(1),
(2) Date: Apr. 20, 2020

(87) PCT Pub. No.: WO2019/082956
PCT Pub. Date: May 2, 2019

(65) Prior Publication Data
US 2020/0388813 A1    Dec. 10, 2020

(30) Foreign Application Priority Data
Oct. 25, 2017 (JP) .............................. JP2017-205983

(51) Int. Cl.
*H01M 50/502* (2021.01)
*H01G 11/10* (2013.01)
*H01G 11/76* (2013.01)

(52) U.S. Cl.
CPC .......... *H01M 50/502* (2021.01); *H01G 11/10* (2013.01); *H01G 11/76* (2013.01)

(58) Field of Classification Search
CPC .. H01M 50/502; H01M 50/209; H01M 50/50; H01M 50/503; H01M 50/505
See application file for complete search history.

(56) References Cited

U.S. PATENT DOCUMENTS

| 2003/0215702 A1 | 11/2003 | Tanjou et al. |
| 2005/0031945 A1 | 2/2005 | Morita et al. |
| 2008/0113526 A1 | 5/2008 | Nakatani et al. |

(Continued)

FOREIGN PATENT DOCUMENTS

| JP | 2004-178860 A | 6/2004 |
| JP | 2006-107808 A | 4/2006 |

(Continued)

OTHER PUBLICATIONS

International Search Report (ISR) (PCT Form PCT/ISA/210), in PCT/JP2018/039618, dated Jan. 29, 2019.

*Primary Examiner* — Stewart A Fraser
(74) *Attorney, Agent, or Firm* — McGinn, I.P. Law Group, PLLC.

(57) ABSTRACT

This embodiment provides an energy storage apparatus that includes: a plurality of energy storage devices, each having an external terminal; and a bus bar configured to conductively connect the external terminals to each other between different ones of the plurality of energy storage devices. The bus bar includes a pair of connecting portions, each placed on the external terminal. Each of the pair of connecting portions includes a plurality of curved welded portions, each formed in a curved shape that convexly curves inward in a first direction where the pair of connecting portions are aligned. The plurality of curved welded portions are formed to be aligned in the first direction.

20 Claims, 16 Drawing Sheets

(56) References Cited

U.S. PATENT DOCUMENTS

| | | | |
|---|---|---|---|
| 2010/0266890 A1* | 10/2010 | Caumont | H01G 11/76 |
| | | | 361/328 |
| 2014/0045039 A1* | 2/2014 | Vigneras | H01G 11/10 |
| | | | 361/434 |
| 2014/0377625 A1 | 12/2014 | Tsutsumi et al. | |
| 2015/0243947 A1 | 8/2015 | Seto et al. | |
| 2018/0117714 A1 | 5/2018 | Scherer et al. | |
| 2018/0294465 A1 | 10/2018 | Nagai et al. | |

FOREIGN PATENT DOCUMENTS

| | | | |
|---|---|---|---|
| JP | 3763525 B | 4/2006 | |
| JP | 4036805 B | 1/2008 | |
| JP | 2008-123922 A | 5/2008 | |
| JP | 2009-233712 A | 10/2009 | |
| JP | 2010-539647 A | 12/2010 | |
| JP | 4645298 B | 3/2011 | |
| JP | 2014-519412 A | 8/2014 | |
| JP | 2015-008087 A | 1/2015 | |
| JP | 2017-079129 A | 4/2017 | |
| JP | 2017-168340 A | 9/2017 | |
| JP | 2017-168349 A | 9/2017 | |
| JP | 2018-181552 A | 11/2018 | |
| WO | WO 2014/064888 A1 | 5/2014 | |
| WO | WO 2017/008947 A1 | 1/2017 | |
| WO | WO 2017/130705 A | 8/2017 | |

\* cited by examiner

ENERGY STORAGE APPARATUS

CROSS-REFERENCE TO RELATED APPLICATIONS

This application is based upon and claims the benefit of priority from the prior Japanese Patent Application No. 2017-205983, the content of which is incorporated herein by reference.

TECHNICAL FIELD

The present invention relates to an energy storage apparatus. The energy storage apparatus includes: a plurality of energy storage devices, each having an external terminal; and a bus bar configured to connect the external terminals to each other.

BACKGROUND ART

Conventionally, there is known a power supply 100 where a plurality of battery cells 101 are connected with each other via a bus bar 102 as illustrated in FIG. 16 (see FIG. 15 of Patent Document 1).

Each of the battery cells 101 is prismatic shaped and is larger in width than in thickness. Each of the battery cells 101 is adjacently laminated to the others of the battery cells 101 in a thickness direction.

The power supply 100 includes a sealing plate 103 as an upper face of each of the battery cells 101. The sealing plate 103 has an electrode 104, one end of which is positive and the other end of which is negative (in other words). The bus bar 102 is conductive and connects the electrodes 104 with each other between adjacent ones of the battery cells 101.

The bus bar 102 has both end edges formed in a concave shape in plan view. Each of the both end edges of the bus bar 102 is welded to the electrode 104 between an adjacent pair of the battery cells 101. As a result, a positive electrode 104 and a negative electrode 104 are electrically connected to each other between the adjacent pair of the battery cells 101.

In the power supply 100, for example, when oscillation or expansion/contraction of each of the battery cells 101 causes the battery cells 101 placed adjacent to each other to relatively move, each of the both end edges of the bus bar 102 relatively moves in response to the movement of the battery cells 101. As a result, the bus bar 102 is subjected to bending force.

In this state, in response to the bending force, stress is concentrated on a section where the bus bar 102 is welded (hereinafter, referred to as a welded portion 105), particularly a section where the bus bar 102 has the concave shape in the plan view, in other words, a section that is convexly curved toward a central side.

Accordingly, in the welded portion 105 of the power supply 100, the section that is convexly curved toward the central side is subjected to most of load applied to the bus bar 102. With this configuration, when the section has a weld defect at manufacturing processes or a damage caused by use, the bus bar 102 is significantly prone to peeling off from the electrode 104.

PRIOR ART DOCUMENT

Patent Document

Patent Document 1: Japanese Translation of PCT International Application JP 2014/064888 A

SUMMARY OF THE INVENTION

Problems to be Solved by the Invention

In view of the respects described above, an object of this embodiment is to provide an energy storage apparatus. The energy storage device includes an energy storage device, and a bus bar that is less prone to peeling off from an external terminal of the energy storage device.

Means for Solving the Problems

This embodiment provides an energy storage apparatus that includes: a plurality of energy storage devices, each having an external terminal; and a bus bar configured to conductively connect the external terminals to each other between different ones of the plurality of energy storage devices. The bus bar includes a pair of connecting portions, each placed on the external terminal. Each of the pair of connecting portions includes a plurality of curved welded portions, each formed in a curved shape that convexly curves inward in a first direction where the pair of connecting portions are aligned. The plurality of curved welded portions are formed to be aligned in the first direction.

MODE FOR CARRYING OUT THE INVENTION

Figure 1:
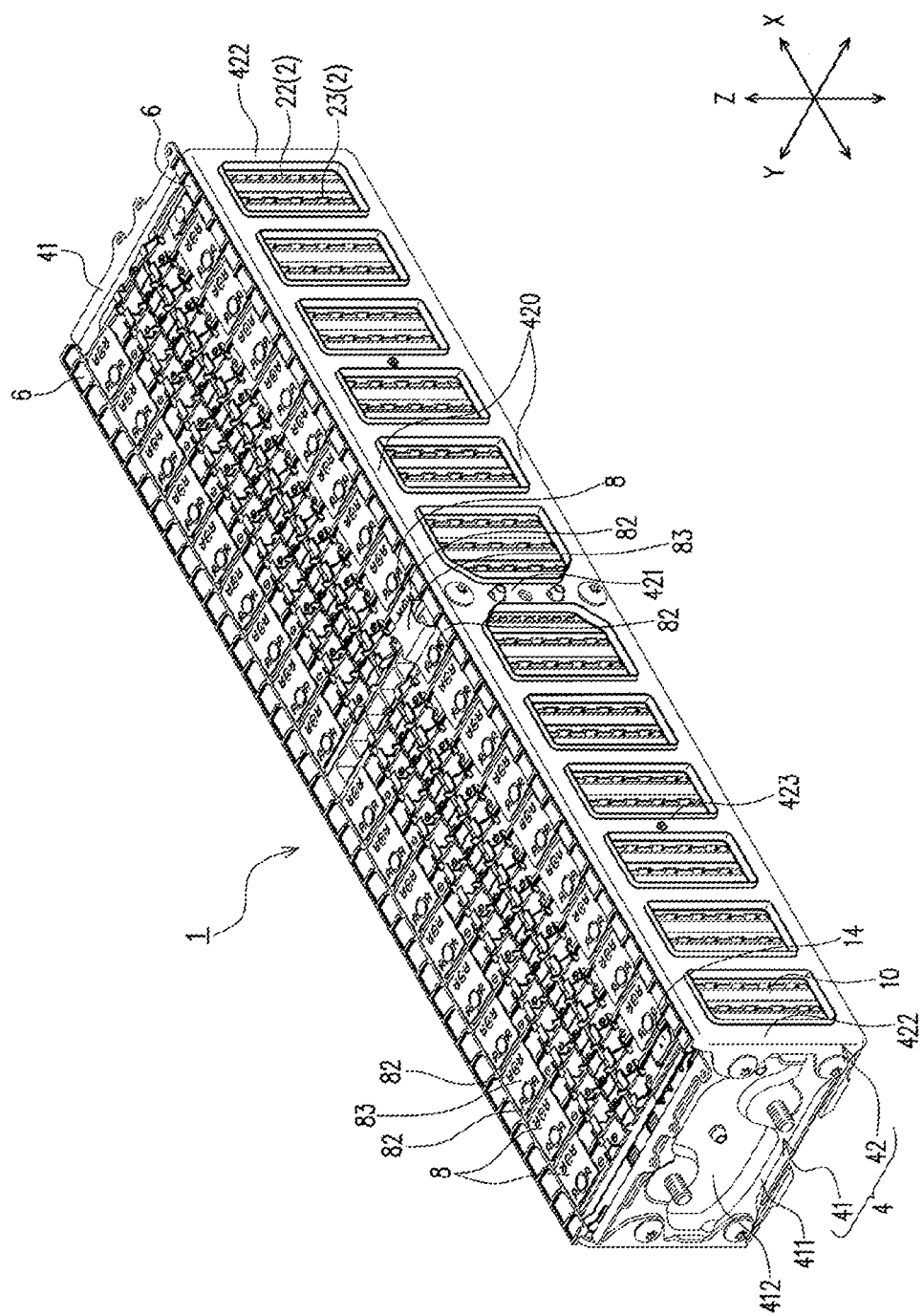
FIG. 1 is a perspective view of an energy storage apparatus according to a first embodiment.

This embodiment provides an energy storage apparatus that includes: a plurality of energy storage devices, each having an external terminal; and a bus bar configured to conductively connect the external terminals to each other between different ones of the plurality of energy storage devices. The bus bar includes a pair of connecting portions, each placed on the external terminal. Each of the pair of connecting portions includes a plurality of curved welded portions, each formed in a curved shape that convexly curves inward in a first direction where the pair of connecting portions are aligned. The plurality of curved welded portions are formed to be aligned in the first direction.

With the configuration described above, when bending force is applied to the bus bar in the energy storage apparatus, each of the curved welded portions formed in the curved shape that convexly curves inward in the first direction is prone to be subjected to stress in response to the bending force. In other words, each of the curved welded portions is a crucial section to have the bus bar and the external terminal maintained in a connected state. In the energy storage apparatus, the curved welded portions are provided in the plurality of numbers, so that the bus bar is less prone to peeling off from the external terminal.

Further, at each of the connecting portions of the energy storage apparatus, the plurality of curved welded portions are formed to be aligned in the first direction. In this state, among the plurality of curved welded portions, the stress is concentrated on one of the curved welded portions that is located at an innermost position in the first direction. Accordingly, in the energy storage apparatus, the stress is rarely concentrated on all of the plurality of curved welded portions, thereby resulting in suppression of simultaneous damage to each of the curved welded portions.

With the energy storage apparatus, each of the plurality of curved welded portions is configured to have an open region that is open outward in the first direction. The open region of each of the curved welded portions may include at least a part of one of the curved welded portions that adjoins the corresponding curved welded portion at an outer side in the first direction.

With this configuration, it is possible to reduce space between the ones of the curved welded portions aligned in the first direction and thus to reduce a width of each of the connecting portions.

In the energy storage apparatus, the plurality of curved welded portions aligned in the first direction may be discontinuous with each other.

With the configuration that the curved welded portions are discontinuous with each other, when one of the curved welded portions is damaged, it is possible to protect the others of the curved welded portions from being damaged in addition to the one of the curved welded portions damaged.

With the energy storage apparatus, at each of the pair of connecting portions, the plurality of curved welded portions may be formed in a plurality of groups. The plurality of groups may be spaced from each other in a second direction that is in orthogonal to the first direction.

The other embodiment provides an energy storage apparatus that includes: a first energy storage device including a first external terminal; a second energy storage device including a second external terminal and adjacent to the first energy storage device; and a bus bar configured to conductively connect the first external terminal with the second external terminal. The bus bar includes: a first connecting portion placed on the first external terminal and connected with the first external terminal; and a second connecting portion placed on the second external terminal and connected with the second external terminal. The first connecting portion includes a plurality of curved welded portions, each formed in a curved shape that convexly curves from the first connecting portion toward the second connecting portion. The plurality of curved welded portions are aligned in a first direction where the first connecting portion and the second connecting portion are aligned.

As has been described above, each of the embodiments provides an energy storage apparatus that includes an energy storage device and a bus bar; and the bus bar is less prone to peeling off from an external terminal of the energy storage device.

Hereinafter, a first embodiment of the present invention will be described with reference to FIGS. 1 to 6. Note that, in this embodiment, each component member (constituent element) is denoted by an exemplary name and thus may be denoted by a different name from that in the background art.

Figure 2:
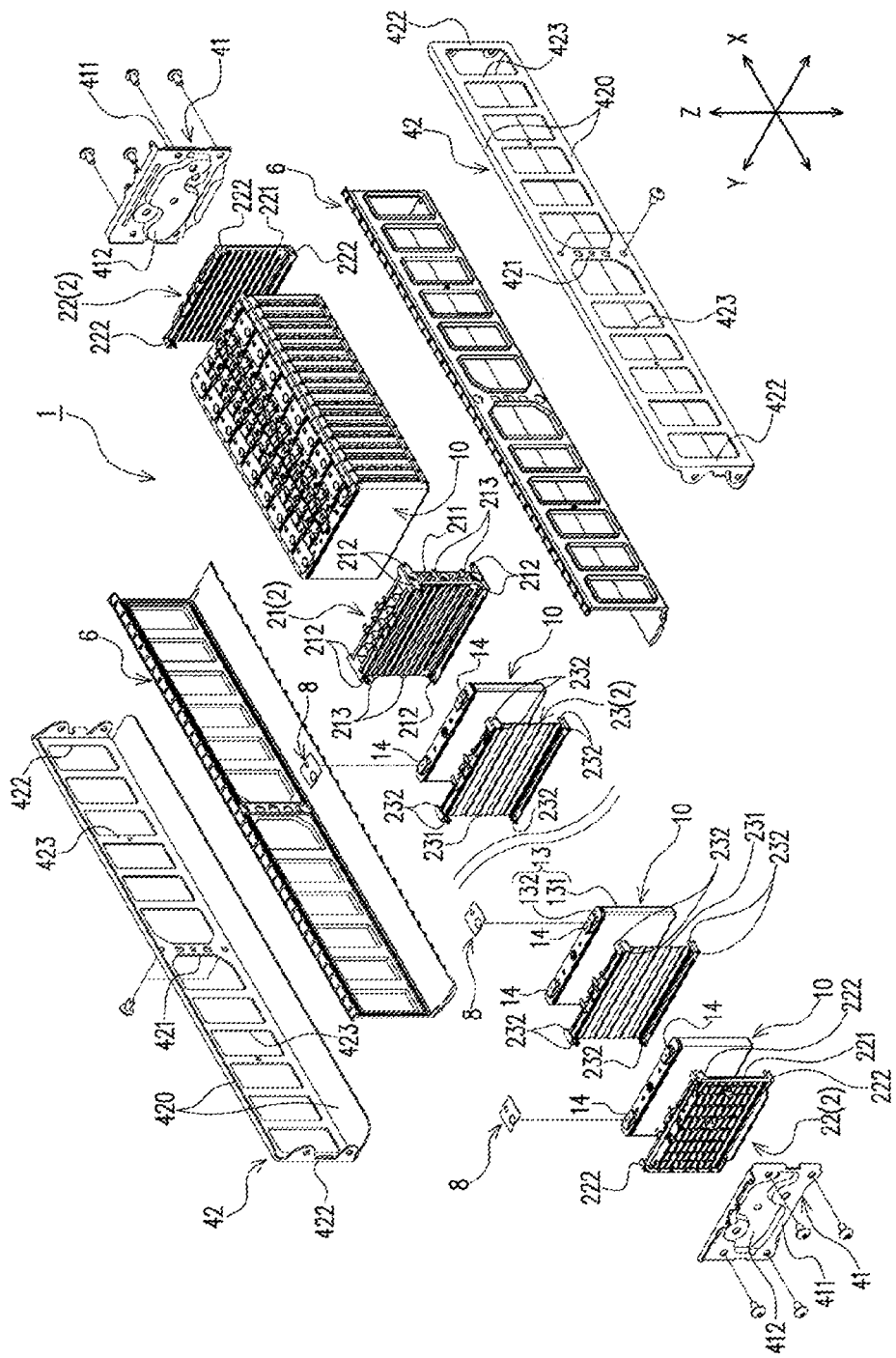
FIG. 2 is an exploded perspective view of the energy storage apparatus.

As illustrated in FIGS. 1 and 2, an energy storage apparatus 1 includes: a plurality of energy storage devices 10, each having an external terminal 14; and a bus bar 8 configured to conductively connect the external terminals 14 to each other between different ones of the energy storage devices 10. The energy storage apparatus 1 further includes a plurality of adjacent members 2, each adjacent to one of the energy storage devices 10, a holding member 4, and an insulator 6. The holding member 4 holds the plurality of energy storage devices 10 and the plurality of adjacent members 2 together. The insulator 6 is provided between the plurality of energy storage devices 10 and the holding member 4.

The plurality of energy storage devices 10 are arranged and aligned in a row in a predetermined direction (X-axis direction). Each of the plurality of energy storage devices 10 is a primary battery, a secondary battery, a capacitor, or the like. The energy storage device 10 of this embodiment is a chargeable/dischargeable nonaqueous electrolyte secondary battery. More specifically, the energy storage device 10 is a lithium ion secondary battery that utilizes electron transfer generated by lithium ion transfer.

Figure 3:
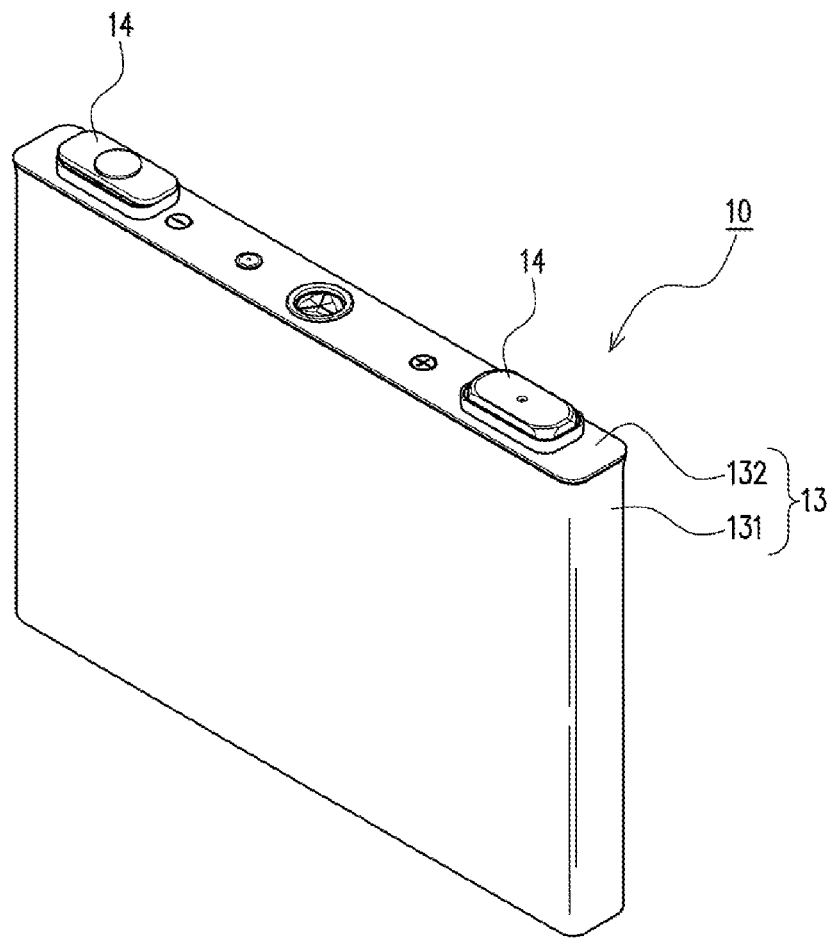
FIG. 3 is a perspective view of an energy storage device included in the energy storage apparatus.
Figure 3:
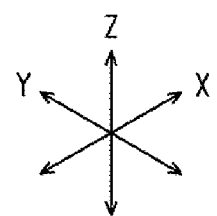
Figure 4:
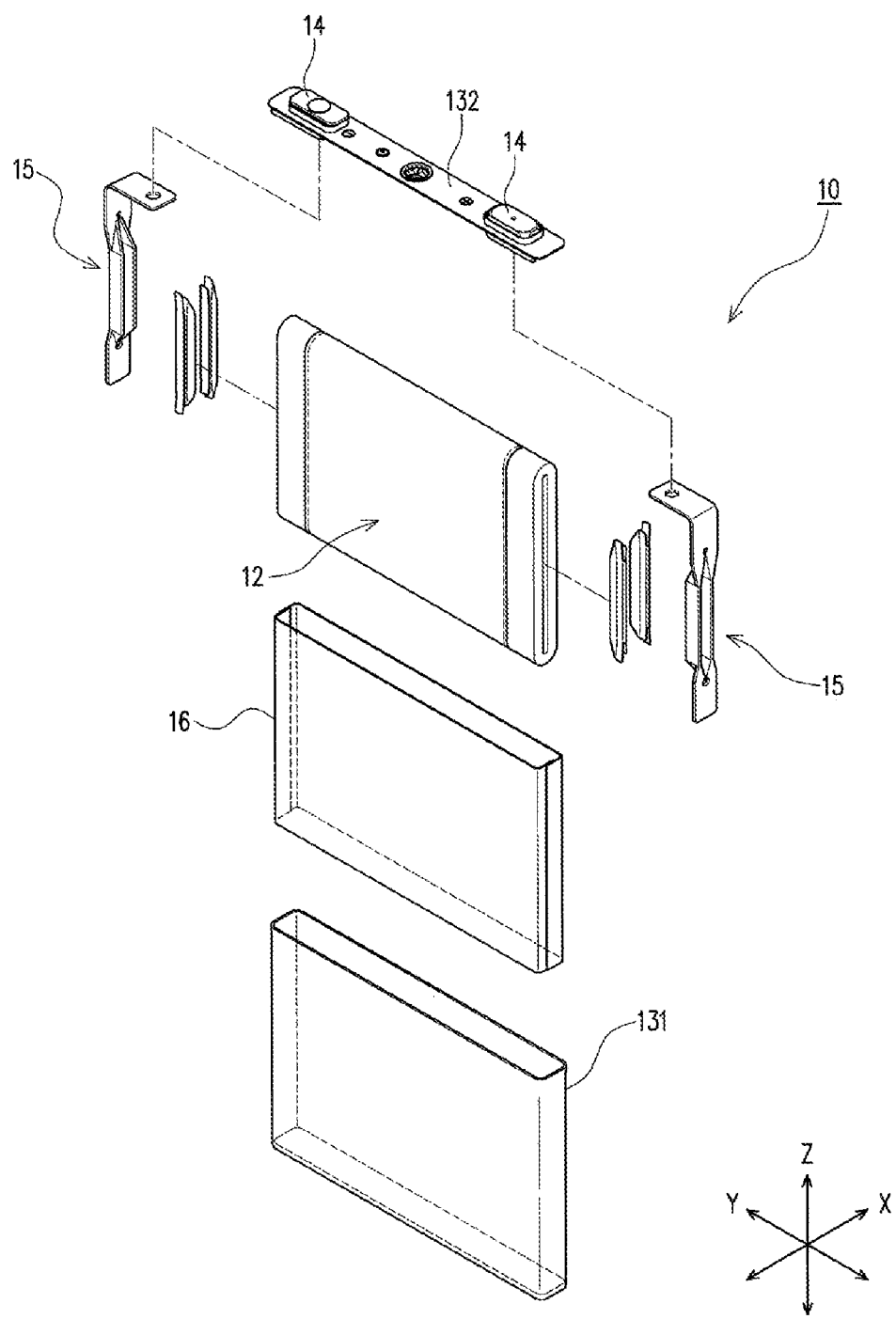
FIG. 4 is an exploded perspective view of the energy storage device.

As illustrated in FIGS. 3 and 4, each of the energy storage devices 10 includes an electrode assembly 12, a case 13, the external terminal 14, a current collector 15, and an in-case insulator 16. The electrode assembly 12 is accommodated along with electrolyte solution in the case 13, and the external terminal 14 is at least partially exposed out of the case 13. The current collector 15 connects the electrode assembly 12 with the external terminal 14, and the in-case insulator 16 is provided between the electrode assembly 12 and the case 13.

The electrode assembly 12 is formed in a laminate where a positive electrode and a negative electrode are alternately laminated with a separator interposed therebetween. In this embodiment, the electrode assembly 12 is a typically called wound-type electrode assembly that is formed by winding the laminate. In the laminate, the positive electrode of large length and the negative electrode of large length are alternately laminated with the separator of large length interposed therebetween. The energy storage device 10 charge/discharges when the lithium ion transfers between the positive electrode and the negative electrode in the electrode assembly 12.

The case 13 includes a case body 131 and a cover plate 132. The case body 131 has an opening. The cover plate 132 is plate-shaped and configured to block (close) the opening of the case body 131. In this embodiment, the case body 131 has a one-end rectangular cylindrical shape, and the case 13 has a rectangular parallelepiped shape (having six faces). In this embodiment, the case 13 is a flat, rectangular parallelepiped case. The plurality of energy storage devices 10 each have broad faces (walls) of the case 13 (case body 131) arranged opposite each other, and are aligned in the X-axis direction.

Hereinafter, a direction in which the plurality of energy storage devices 10 are aligned will be referred to as the X-axis in an X-Y-Z orthogonal coordinate system; a direction in which a pair of narrow faces (walls) of the case body 131 are opposite each other will be referred to as a Y-axis in the X-Y-Z orthogonal coordinate system; and a normal direction of the cover plate 132 will be referred to as a Z-axis in the X-Y-Z orthogonal coordinate system.

As illustrated in FIGS. 1 and 2, each of the adjacent members 2 is provided between the energy storage devices 10 that are aligned in the row in the X-axis direction, or is provided between one of the energy storage devices 10 in the X-axis direction and a member that is aligned with the one of the energy storage devices 10 (the member corresponding to a part of the holding member 4 in an example of this embodiment). The adjacent member 2 includes a plurality of types of adjacent members. Specifically, the adjacent member 2 includes a first adjacent member 21, a second adjacent member 22, and a third adjacent member 23. The first adjacent member 21 is adjacent to the energy storage devices 10 that are positioned at a middle of the row aligned in the X-axis direction. The second adjacent member 22 is adjacent to the energy storage device 10 that is positioned at each end of the row aligned in the X-axis direction, and is adjacent to an outer side of the energy storage device 10. The third adjacent member 23 is adjacent to the energy storage devices 10, each of which is positioned between the first adjacent member 21 and the second adjacent member 22 in the X-axis direction.

The first adjacent member 21 has insulating properties and is provided between the energy storage devices 10 where the external terminals 14 are connected to each other via the bus bar 8. With this configuration, the energy storage devices 10, aligned in the X-direction with the first adjacent member 21 interposed therebetween, secure a predetermined distance (e.g., creepage distance) from each other. The first adjacent member 21 is connected (fixed) to the holding member 4.

Specifically, the first adjacent member 21 includes a first main portion 211 and a first restricting portion 212. The first main portion 211 is plate-shaped and provided between the energy storage devices 10 adjoining each other. The restricting portion 212 restricts a movement of each of the energy storage devices 10 (that is adjacent to the first main portion 211) with respect to the first main portion 211. The first adjacent member 21 also includes an engaging portion 213 that engages with the holding member 4.

The first main portion 211 faces opposite the broad face of the case 13 of each of the energy storage devices 10 (that is adjacent to the first main portion 211) and extends in a Y-Z plane (a plane including the Y axis and the Z axis) direction. In this embodiment, between the first main portion 211 and the energy storage device 10 adjacent to the first main portion 211, a flow path is formed, and fluid for temperature adjustment (air in the example of this embodiment) flows through the flow path.

The first restricting portion 212 extends in the X-axis direction from the first main portion 211, and abuts an outer side of each of the energy storage devices 10 (specifically, the cases 13) in the Y-Z plane direction, each of the energy storage devices 10 adjacent to the first main portion 211. With this configuration, the first restricting portion 212 restricts the relative movement of the corresponding energy storage device 10 in the Y-Z plane direction with respect to the first main portion 211. In this embodiment, the first restricting portion 212 extends from the first main portion 211 toward both sides of the X-axis direction.

The engaging portion 213 extends outward from a Y-axis end of the first main portion 211, and engages with the holding member 4. In this embodiment, the engaging portion 213 is shaft-shaped and extends outward from each Y-axis end of the first main portion 211.

The second adjacent member 22 has insulating properties, and is provided between the energy storage device 10 (positioned at the each end of the row in the X-axis direction) and the holding member 4 (a terminal member 41) in the X-axis direction so that space (creepage distance) is secured between the energy storage device 10 and the holding member 4 (terminal member 41). Specifically, the second adjacent member 22 between the energy storage device 10 and the holding member 4 includes a second main portion 221 and a second restricting portion 222. The second main portion 221 is adjacent to the energy storage device 10, and the second restricting portion 222 restricts a movement of the energy storage device 10 with respect to the second main portion 221.

The second main portion 221 faces opposite the broad face of the case 13 of the energy storage device 10 positioned at the each end of the row in the X-axis direction, and extends in the Y-Z plane direction. In this embodiment, between the second main portion 221 and the energy storage device 10 adjacent to the second main portion 221, a flow path is formed, and the fluid for temperature adjustment (air in the example of this embodiment) flows through the flow path.

The second restricting portion 222 extends in the X-axis direction from the second main portion 221, and abuts an outer side of the energy storage device 10 (specifically, the case 13) in the Y-Z plane direction, the energy storage device 10 adjacent to the second main portion 221. With this configuration, the second restricting portion 222 restricts the relative movement of the energy storage device 10 in the Y-Z plane direction with respect to the second main portion 221.

The third adjacent member 23 has insulating properties. The third adjacent member 23 is provided between the energy storage devices 10 where the external terminals 14 are connected to each other via the bus bar 8. Thus, space (e.g., creepage distance) between the energy storage devices 10 is secured. Specifically, the third adjacent member 23 includes a third main portion 231 and a third restricting portion 232. The third main portion 231 is adjacent to each of the energy storage devices 10 (each case body 131) adjoining, and the third restricting portion 232 restricts a movement of the corresponding energy storage device 10 with respect to the third main portion 231.

The third main portion 231 faces opposite the broad face of the case 13 of the energy storage device 10 (that is adjacent to the third main portion 231) and extends in the Y-Z plane direction. In this embodiment, between the third main portion 231 and the energy storage device 10 adjacent to the third main portion 231, a flow path is formed, and the fluid for temperature adjustment (air in the example of this embodiment) flows through the flow path.

The third restricting portion 232 extends in the X-axis direction from the third main portion 231, and abuts an outer side of each of the energy storage devices 10 (specifically, the case 13) in the Y-Z plane direction, each of the energy storage devices 10 adjacent to the third main portion 231. With this configuration, the third restricting portion 232 restricts the relative movement of the corresponding energy storage device 10 in the Y-Z plane direction with respect to the third main portion 231.

The holding member 4 surrounds the plurality of energy storage devices 10 and the plurality of adjacent members 2 to hold the plurality of energy storage devices 10 and the plurality of adjacent members 2 together. The holding member 4 is a metal member or the like. Specifically, the holding member 4 includes a pair of terminal members (end portions) 41 and a pair of connector members 42. The pair of terminal members 41 are respectively provided at one side and the other side of the row of the plurality of energy storage devices 10 in the X-axis direction. The pair of connector members 42 connects the pair of terminal members 41 to each other.

Each of the pair of terminal members 41 is provided to sandwich the second adjacent member 22 with the energy storage device 10 positioned at the each end of the row in the X-axis direction. The terminal member 41 extends in the Y-Z plane direction. Specifically, the terminal member 41 includes a main body 411 and a pressure-fit portion 412. The main body 411 has an outline corresponding to that of the energy storage device 10 (a rectangular outline in this embodiment). The pressure-fit portion 412 protrudes from the main body 411 toward the second adjacent member 22 and abuts the second adjacent member 22 to press the second adjacent member 22.

The pair of connector members 42 are provided in the Y-axis direction, at both sides of the plurality of energy storage devices 10. Each of the pair of connector members 42 includes a pair of beam portions 420, a first connector portion 421, and a pair of second connector portions 422. The pair of beam portions 420 extend in the X-axis direction and are spaced from each other in the Z-axis direction. The first connector portion 421 connects the pair of beam portions 420 at a middle of the pair of beam portions 420 in the X-axis direction (in the example of this embodiment, at a position where the first connector portion 421 is superimposed with the first adjacent member 21 when viewed in the Y-axis direction). The pair of second connector portions 422 connect the pair of beam portions 420 at both ends of the pair of the beam portions. Each of the connector members 42 also includes a third connector portion 423 that connects the pair of beam portions 420 between the first connector portion 421 and the second connector portions 422. In this embodiment, the third connector portion 423 is provided in a plurality of numbers in each of the connector members 42.

The insulator 6 has insulating properties. The insulator 6 is provided between each of the connector members 42 and the plurality of energy storage devices 10. Specifically, the insulator 6 covers at least a region of each of the connector members 42, the region opposite the plurality of energy storage devices 10. With this configuration, the insulator 6 insulates each of the connector members 42 from the plurality of energy storage devices 10.

The bus bar 8 is a conductive member such as a metal, and conductively connects the external terminals 14 to each other (a first external terminal and a second external terminal) between different ones of the energy storage devices 10 (a first energy storage device, and a second energy storage device adjacent to the first energy storage device). In the energy storage apparatus 1, the bus bar 8 is provided in a plurality of numbers (a number corresponding to that of the plurality of energy storage devices 10). In this embodiment, the bus bars 8 provided in the plurality of numbers are configured to connect (generate electrical conductivity between) all the plurality of energy storage devices 10 in series in the energy storage apparatus 1. In this embodiment, each of the bus bars 8 is, at its both ends in the X-axis direction, welded to the external terminal 14. In this state, the external terminals 14 are electrically connected to each other between adjoining ones of the energy storage devices 10 in the X-axis direction.

Figure 5:
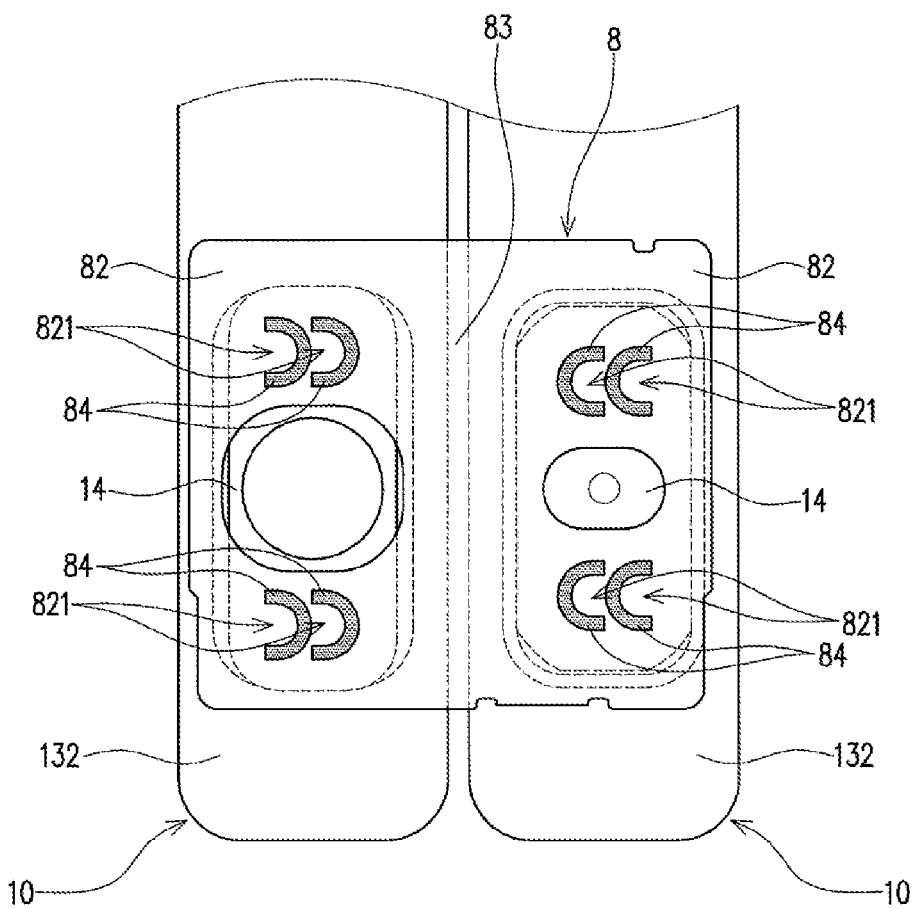
FIG. 5 is a plan view of a bus bar that is welded to an external terminal of the energy storage device.
Figure 5:
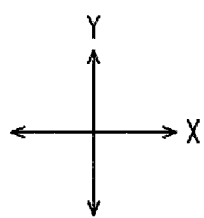
Figure 6:
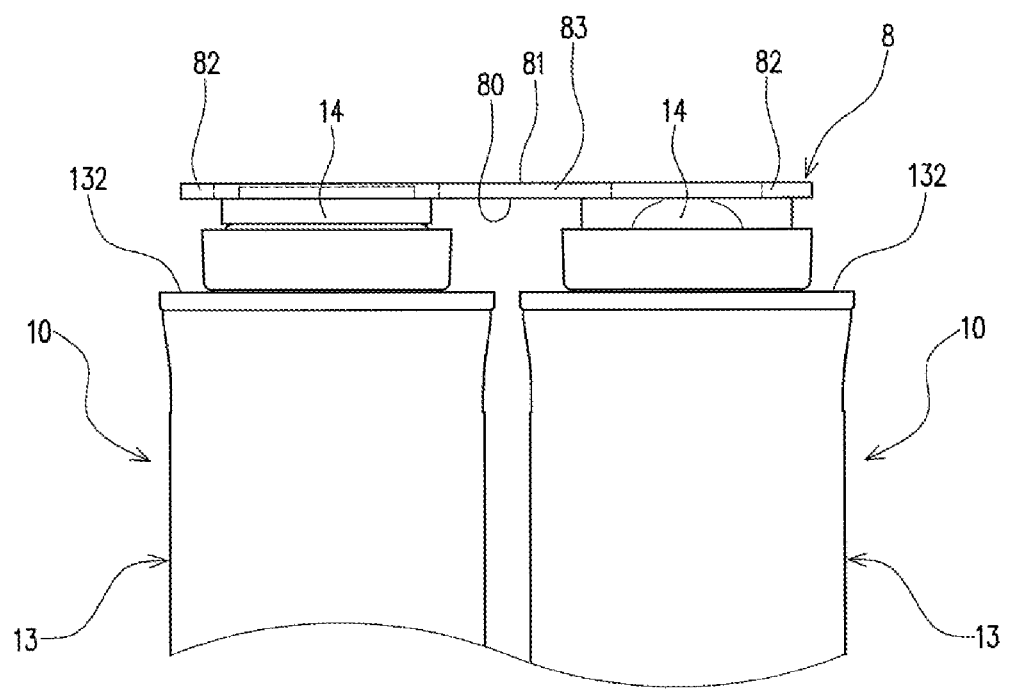
FIG. 6 is a side view of the bus bar that is welded to the external terminal.
Figure 6:
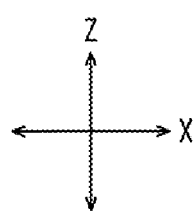

As illustrated in FIGS. 5 and 6, the bus bar 8 has a first plane 80 and a second plane 81. The first plane 80 is closer to the energy storage device 10 and the second plane 81 is on the opposite side of the first plane 80.

The bus bar 8 according to this embodiment further includes a pair of connecting portions 82 and an interposing portion 83. Each of the pair of connecting portions 82 is provided to be placed on the corresponding external terminal 14, and the interposing portion 83 is interposed between the pair of connecting portions 82. Hereinafter, one of the pair of connecting portions 82 that is provided to be placed on the external terminal (first external terminal) 14 of the first energy storage device may be referred to as a first connecting portion. Similarly, the other of the pair of connecting portions 82 that is provided to be placed on the external terminal (second external terminal) 14 of the second energy storage device may be referred to as a second connecting portion.

The pair of connecting portions 82 are aligned in a first direction that corresponds to the X-axis direction. At each of the pair of connecting portions 82, a plurality of curved welded portions 84 welded to the external terminal 14 are formed. In this embodiment, the plurality of curved welded portions 84 are formed in a group and aligned in the X-axis direction (in other words, in the direction where the pair of connecting portions 82 are aligned). Further, the curved welded portions 84, formed in each of the groups and aligned in the X-axis direction, are formed in two arrays in the Y-axis direction, the two arrays spaced from each other.

In this embodiment, two of the curved welded portions 84 aligned in the X-axis direction are formed as each of the groups. In a description below, in these two of the curved welded portions 84, the curved welded portion 84 formed at an inner side in the X-axis direction may be referred to as an inner welded portion 84; and the curved welded portion 84 formed at an outer side in the X-axis direction with respect to the inner welded portion 84 may be referred to as an outer welded portion 84.

Each of the curved welded portions 84 corresponds to a section where the bus bar 8 and the external terminal 14 are welded together.

Each of the curved welded portions 84 is formed in a curved shape (circular arc shape in this embodiment) that convexly curves inward in the X-axis direction. In other words, the curved welded portion 84 at the first connecting portion 82 is formed in a curved shape that convexly curves toward the second connecting portion 82. Concurrently, the curved welded portion 84 at the second connecting portion 82 is formed in a curved shape that convexly curves toward the first connecting portion 82. As described above, each of the curved welded portions 84 is formed in the curved shape that convexly curves inward in the X-axis direction, and is thus open outward in the X-axis direction. In other words, both ends of each of the curved welded portions 84 are discontinuous with each other. Between the both ends, an open region 821 that is open outward in the X-axis direction is formed.

Here, a positional relationship between the inner welded portion 84 and the outer welded portion 84 will be described. In this embodiment, the inner welded portion 84 is aligned or substantially aligned with the outer welded portion 84 in the Y-axis direction. However, when the inner welded portion 84 and the outer welded portion 84 are partially aligned with each other in the X-axis direction, positions of the inner welded portion 84 and the outer welded portion 84 may be shifted to the Y-axis direction.

With regard to the bus bar 8 of this embodiment, when each of the pair of connecting portions 82 has a flat plate shape to be placed on the external terminal 14, the shape of the interposing portion 83 is not particularly limited. Accordingly, the interposing portion 83 may be flat, plate-shaped like the interposing portion 83 of the bus bar 8 that is provided to stretch over the third adjacent member 23. Alternatively, the interposing portion 83 may be curved-shaped like the interposing portion 83 of the bus bar 8 that is provided to stretch over the first adjacent member 21.

With regard to the energy storage apparatus 1 that has been described above, oscillation may be applied to the energy storage apparatus 1 or expansion/contraction of the energy storage devices 10 (case 13) may occur, causing the external terminal 14 of each of the energy storage devices 10 (adjoining in the X-axis direction) to be relatively out of position. As a result, the bus bar 8 is subjected to bending force.

In this state, each of the curved welded portions 84, formed in the curved shape that convexly curves inward in the X-axis direction, is prone to be subjected to stress in response to the bending force. In other words, each of the curved welded portions 84 is a crucial section to have the bus bar 8 and the external terminal 14 maintained in a connected state. In the energy storage apparatus 1, the curved welded portions 84 are thus provided in the plurality of numbers. In this state, the bus bar 8 is less prone to peeling off from the external terminal 14.

Further, the plurality of curved welded portions 84 are arranged and aligned in the X-axis direction on each of the connecting portions 82 of the energy storage apparatus 1. In this state, the stress is concentrated on the curved welded portion 84 that is located at an innermost position among the curved welded portions 84 in the X-axis direction. With this configuration, in the energy storage apparatus 1, the stress is rarely concentrated on all of the plurality of curved welded portions 84, thereby resulting in suppression of simultaneous damage to each of the curved welded portions 84.

In energy storage apparatus 1, the curved welded portions 84 aligned in the X-axis direction are discontinuous with each other. Accordingly, even when one of the curved welded portions 84 is damaged (in other words, even when the bus bar 8 is disconnected from the external terminal 14 at one of the curved welded portions 84), it is possible to protect the others of the curved welded portions 84 from being damaged in addition to the one of the curved welded portions 84.

The energy storage apparatus 1 has each of the welded portions formed in the circular arc shape such as the curved welded portion 84. This configuration causes the energy storage apparatus 1 to secure conductivity as well as to secure strength to load in all directions, particularly in the Z-axis direction. Further, each of the welded portions is welded only in a section required of the strength, so that a rate of defects due to spattering or the like is lower than in a case where the corresponding welded portion is welded in a circular shape.

Note that, an energy storage device according to the present invention is not limited to the foregoing embodiment, and various modifications may be made within a range not deviating from the spirit of the present invention. For example, configurations described in an embodiment may additionally include those in other embodiments, or may be partially replaced with those in other embodiments. Further, the configurations described in the embodiment may be partially deleted.

Figure 7:
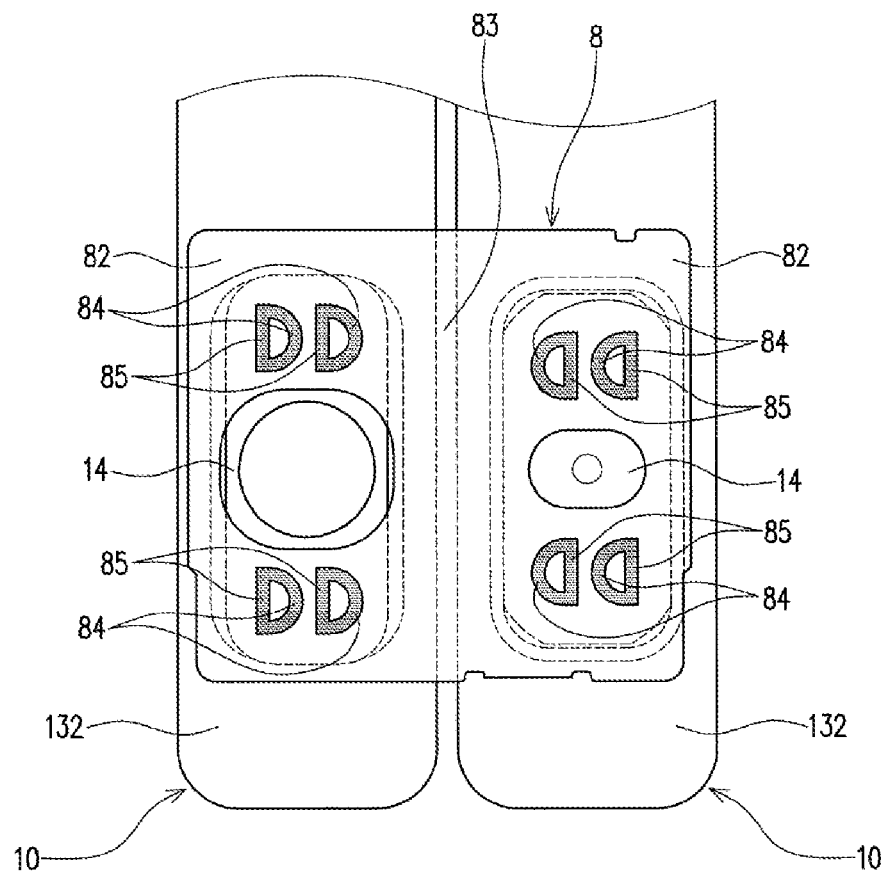
FIG. 7 is a plan view of a bus bar in an energy storage apparatus according to an other embodiment, and illustrates an example of a welding pattern.
Figure 7:
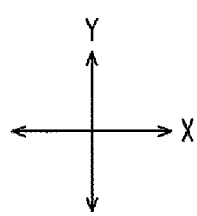
Figure 8:
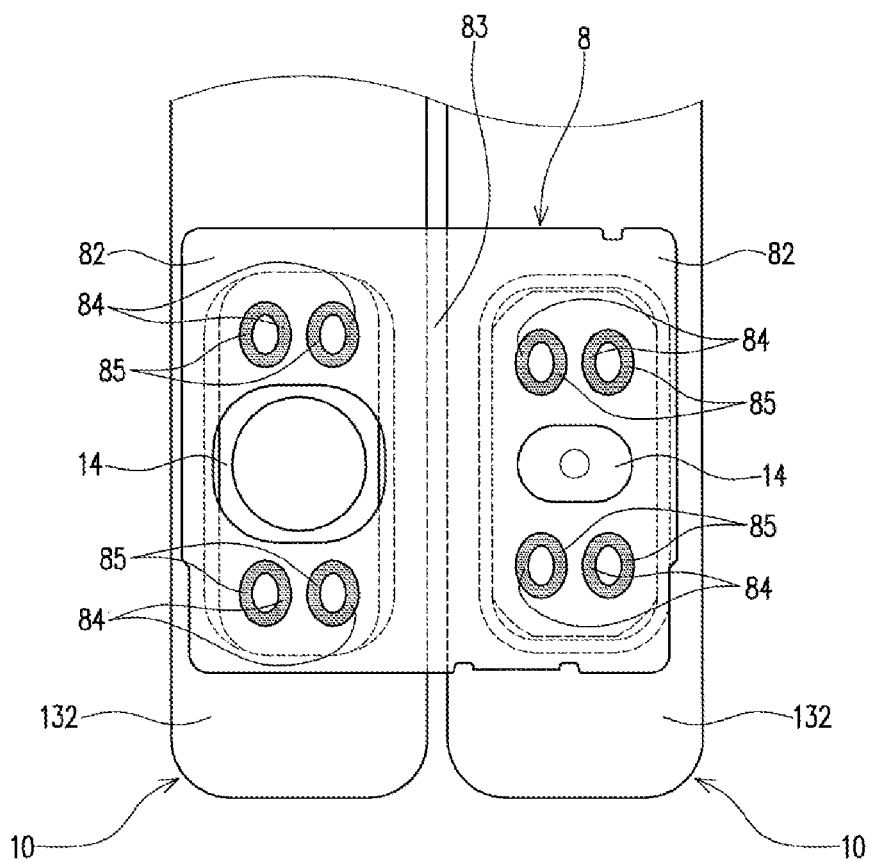
FIG. 8 is a plan view of the bus bar in the energy storage apparatus according to the other embodiment, and illustrates the other example of the welding pattern.
Figure 8:
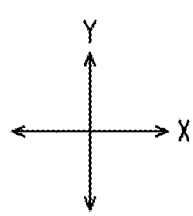
Figure 9:
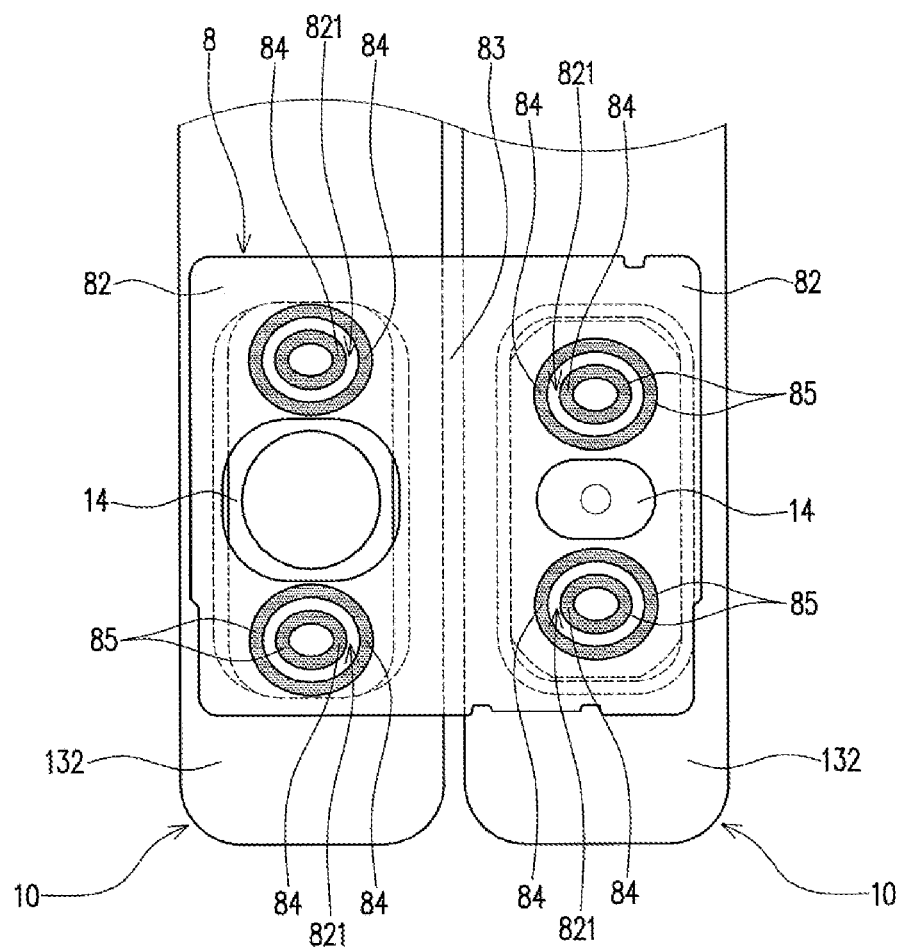
FIG. 9 is a plan view of a bus bar in an energy storage apparatus according to an another embodiment, and illustrates an example of a welding pattern.
Figure 9:
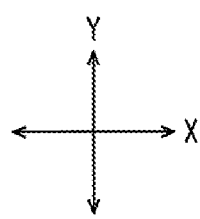

In the foregoing embodiment, each of the curved welded portions 84 is open outward in the X-axis direction; however, the present invention is not limited thereto. For example, each of the curved welded portions 84 may be enclosed in an annular-shaped welded portion as illustrated in FIGS. 7, 8, and 9.

In other words, each of the curved welded portions 84 may be formed in a shape where a closing welded portion 85 stretches to both ends of the corresponding curved welded portion 84 to cause continuity between the both ends. The closing welded portion 85 may be linear-shaped as illustrated in FIG. 7, or may be curved-shaped as illustrated in FIGS. 8 and 9. Note that, in a case where the curved welded portion 84 and the closing welded portion 85 are both formed on each of the connecting portions 82, as illustrated in FIG. 9, a single, annular-shaped welded portion that is formed of the curved welded portion 84 and the closing welded portion 85 may internally include: another one of the curved welded portions 84 or another welded portion formed of the curved welded portion 84 and the closing welded portion 85.

Figure 10:
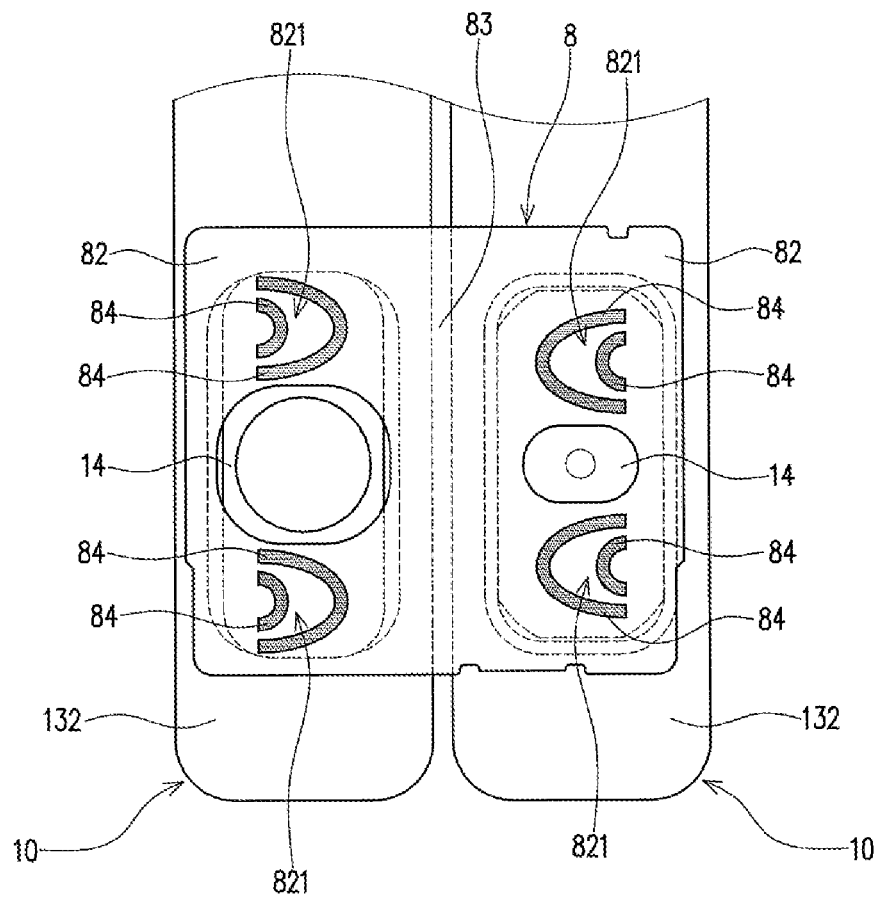
FIG. 10 is a plan view of the bus bar in the energy storage apparatus according to the another embodiment, and illustrates the other example of the welding pattern.
Figure 10:
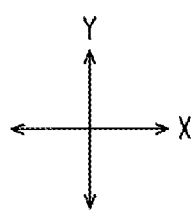

In the foregoing embodiment, the outer welded portion 84 is formed at the outer side of the open region 821 of the inner welded portion 84; however, the present invention is not limited thereto. For example, as illustrated in FIG. 10, the open region 821 of the inner welded portion 84 may include at least a part of the outer welded portion 84 (in other words, the curved welded portion 84 adjoining the inner welded portion 84 at the outer side in the X-axis direction). In this case, it is possible to reduce space between ones of the curved welded portions 84 aligned in the X-axis direction and thus to reduce a width of each of the connecting portions 82.

Further, with this configuration, the inner welded portion 84, on which the stress in response to the bending force on the bus bar 8 is most concentrated, is increased in size such that the inner welded portion 84 is increased in strength. Here, the bus bar 8 is less prone to peeling off from the external terminal 14.

Figure 11:
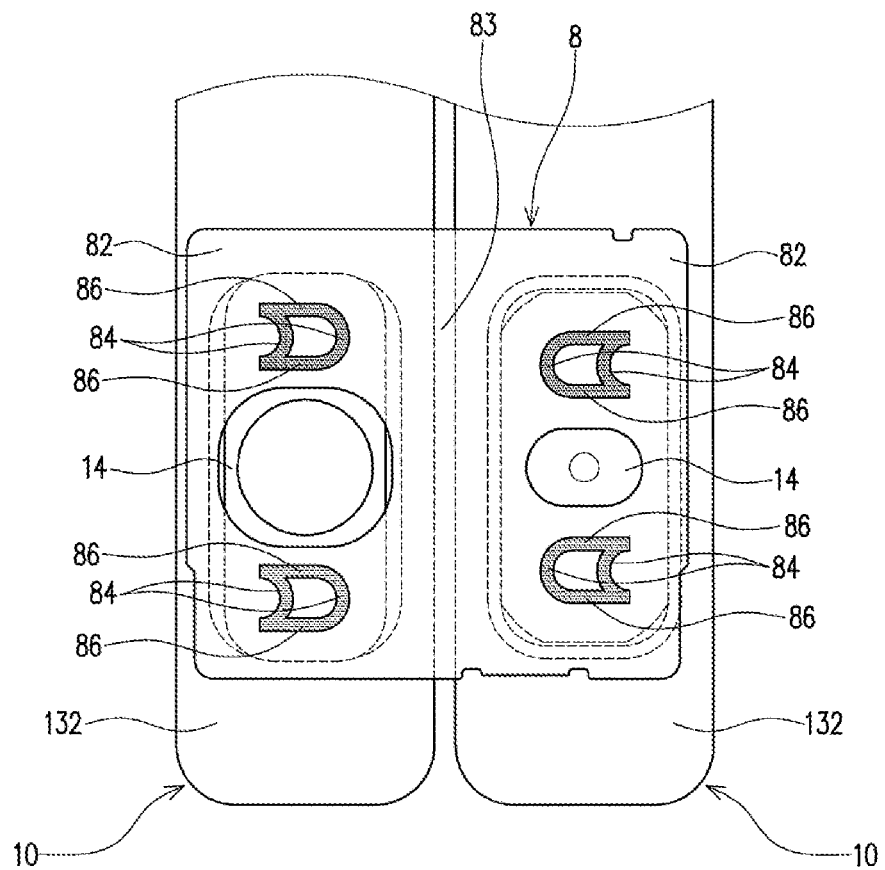
FIG. 11 is a plan view of a bus bar in an energy storage apparatus according to a further another embodiment, and illustrates an example of a welding pattern.
Figure 11:
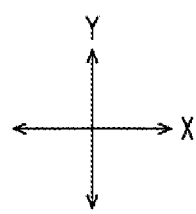
Figure 12:
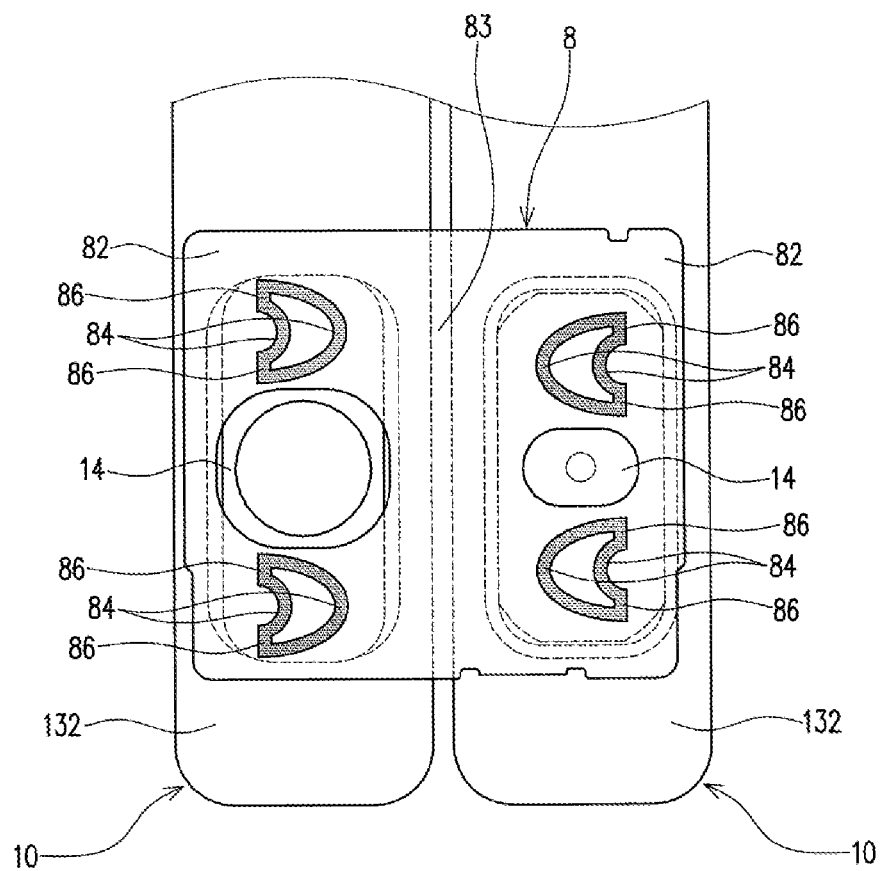
FIG. 12 is a plan view of the bus bar in the energy storage apparatus according to the further another embodiment, and illustrates the other example of the welding pattern.
Figure 12:
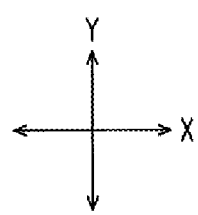

In the foregoing embodiment, the curved welded portions 84 in each of the groups, while arranged and aligned in the X-axis direction, are discontinuous with each other; however, the present invention is not limited thereto. For example, as illustrated in FIGS. 11 and 12, at each of the connecting portions 82, a connecting welded portion 86 may be provided to connect between the curved welded portions 84 in each of the groups, the curved welded portions 84 arranged and aligned in the X-axis direction. Alternatively, the both ends of each of the curved welded portions 84 may be directly connected with each other. Note that, the connecting welded portion 86 may preferably be configured to connect the both ends of each of the curved welded portions 84 to generate continuity between the both ends of the corresponding curved welded portion 84.

Figure 13:
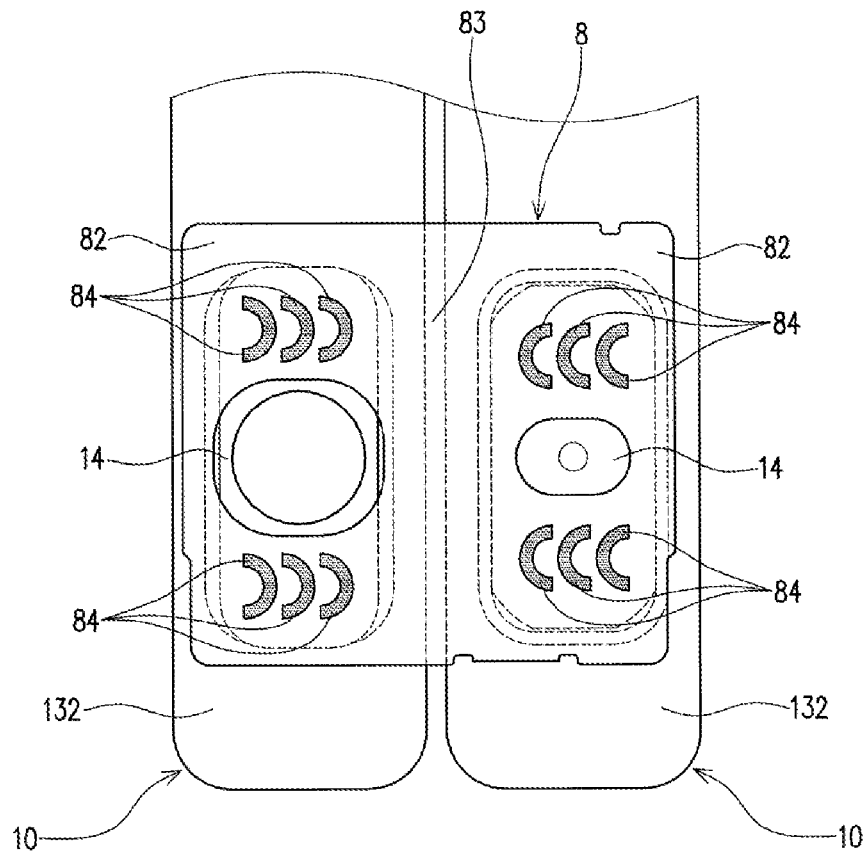
FIG. 13 is a plan view of a bus bar in an energy storage apparatus according to a still further another embodiment, and illustrates an example of a welding pattern.
Figure 13:
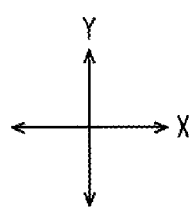

In the foregoing embodiment, at each of the connecting portions 82, two of the curved welded portions 84 are formed as each group; however, the present invention is not limited thereto. For example, as illustrated in FIG. 13, on each of the connecting portions 82, three of the curved welded portions 84 may be formed as a group, or four or more of the curved welded portions 84 may be formed as the group.

Figure 14:
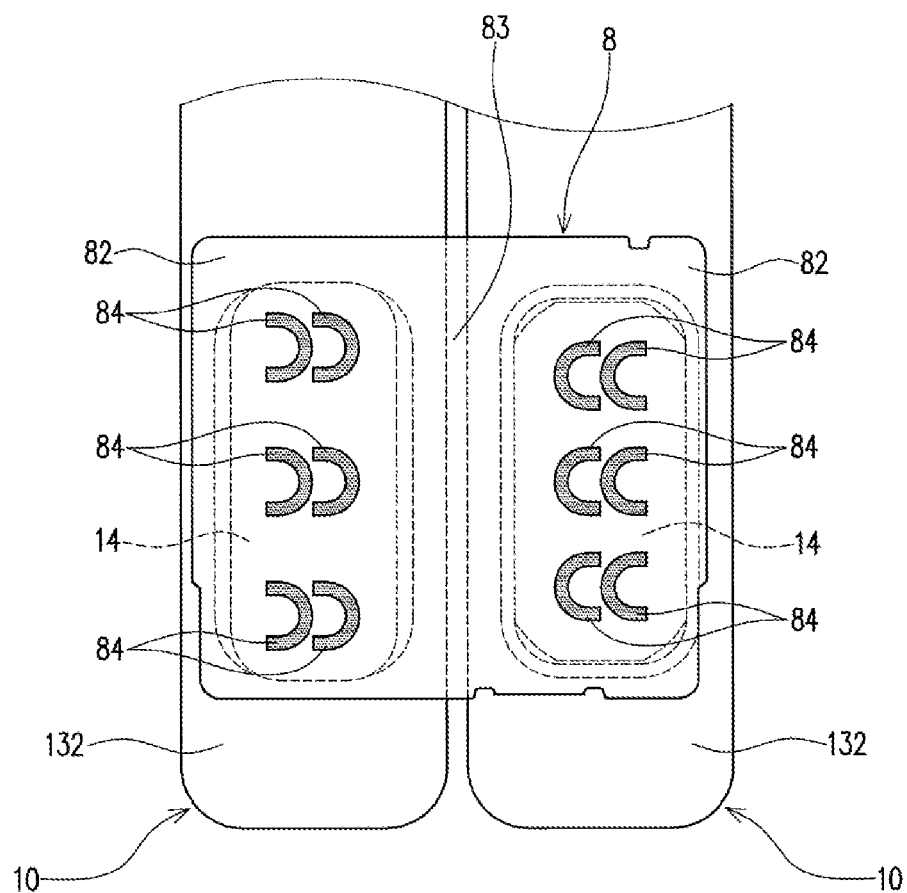
FIG. 14 is a plan view of the bus bar in the energy storage apparatus according to the still further another embodiment, and illustrates the other example of the welding pattern.
Figure 14:
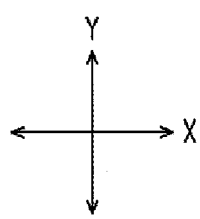
Figure 15:
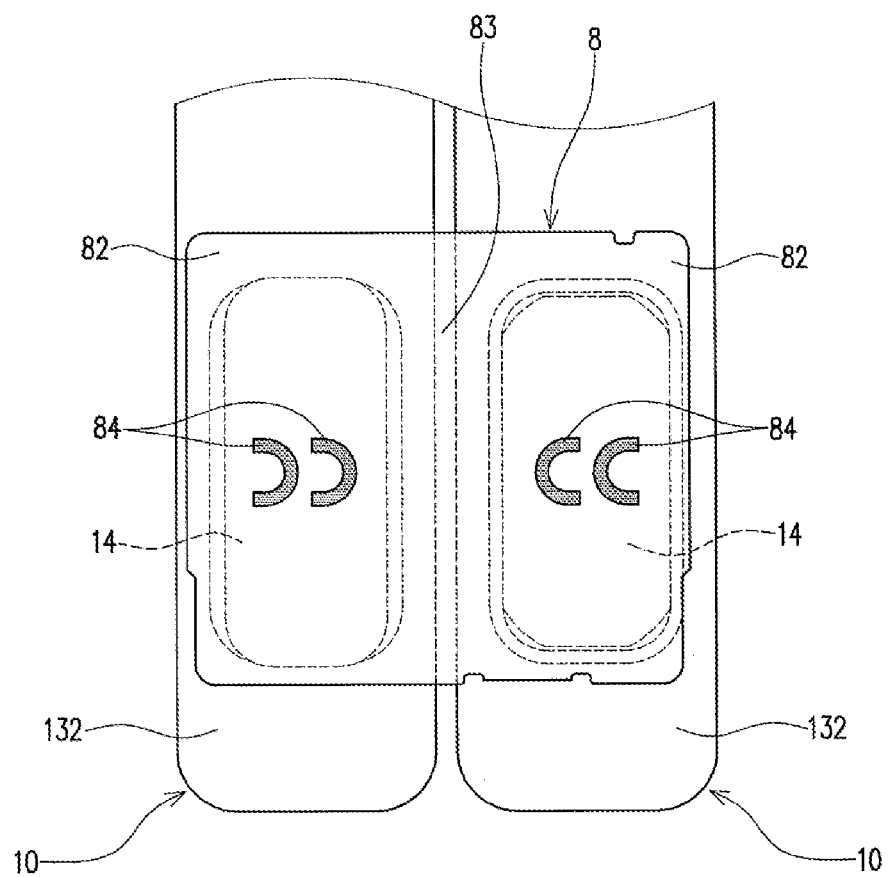
FIG. 15 is a plan view of a bus bar in an energy storage apparatus according to an even further another embodiment, and illustrates further another example of a welding pattern.
Figure 16:
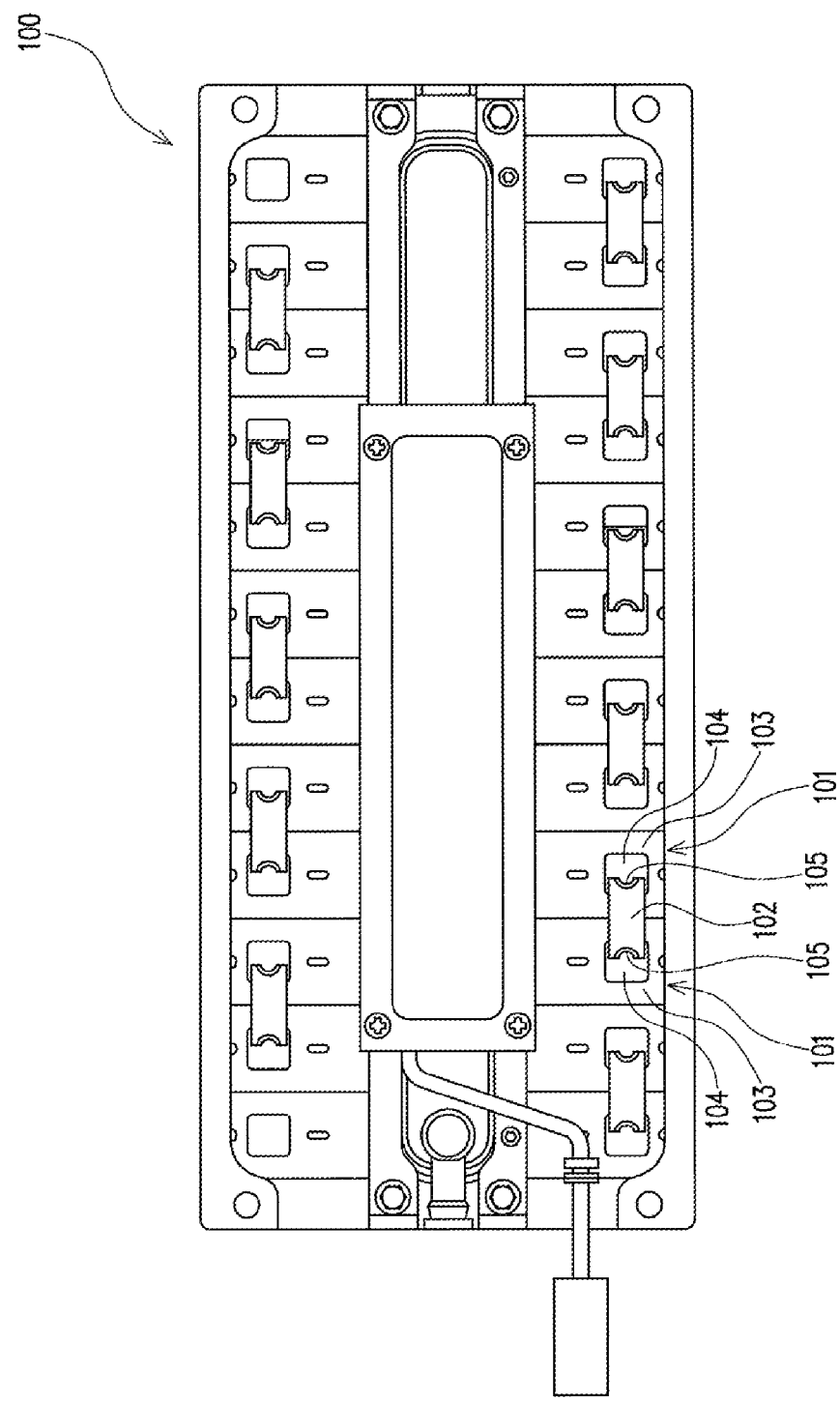
FIG. 16 illustrates a bus bar in a conventional power supply.

In the foregoing embodiment, at each of the connecting portions 82, the curved welded portions 84 in each of the groups are formed in two arrays in the Y-axis direction, the two arrays spaced from each other; however, the present invention is not limited thereto. For example, as illustrated in FIG. 14, the curved welded portions 84 in each of the groups may be aligned in three arrays in the Y-axis direction. Alternatively, as illustrated in FIG. 15, the curved welded portions 84 in each of the groups may be formed in a single array in the Y-axis direction.

In the foregoing embodiment, the plurality of curved welded portions 84 in each of the groups are formed in an identical or a substantially identical size; however, the present invention is not limited thereto. For example, the plurality of curved welded portions 84 in each of the groups may be formed in different sizes. Further, the plurality of curved welded portions 84 in each of the groups may be formed in different curvatures.

In the foregoing embodiment, at the outer side of the inner welded portion 84 (the number of which is one) in the X-axis direction, the outer welded portion 84 (the number of which is one) is formed; however, the present invention is not limited thereto. For example, in the foregoing embodiment, at the outer side of the inner welded portion 84 (the number of which is one) in the X-axis direction, the outer welded portion 84 may be formed in a plurality of numbers. Alternatively, at the inner side of the outer welded portion 84 (the number of which is one) in the X-axis direction, the inner welded portion 84 may be formed in a plurality of numbers.

In the foregoing embodiment, the bus bar 8 connects the external terminals 14 with each other between the adjoining ones of the energy storage devices 10, the adjoining ones having the first adjacent member 21 interposed therebetween; however, the present invention is not limited thereto. Alternatively, the bus bar 8 may connect the external terminals 14 with each other between the adjoining ones of the energy storage devices 10, the adjoining ones having the other adjacent member (e.g., the second adjacent member 22 or the third adjacent member 23) interposed therebetween. Still alternatively, the bus bar 8 may connect the external terminals 14 with each other between the adjoining ones of the energy storage devices 10, the adjoining ones not having any of the adjacent member 2 interposed therebetween.

In the foregoing embodiment, the energy storage device 10 used in the energy storage apparatus 1 includes the electrode assembly 12 that is the typically called wound-type electrode assembly; however, the present invention is not limited thereto. The energy storage device 10 may include a typically called laminate electrode assembly where sheet-shaped electrodes are laminated, or may include an electrode assembly where at least one of the positive electrode and the negative electrode is of large length and is zigzag-folded (sinuously folded).

While not specifically mentioned in the foregoing embodiment, the energy storage apparatus 1 may be configured to cool the energy storage device 10 with gas or may be configured to cool the energy storage device 10 with liquid. In other words, the energy storage apparatus 1 may be a typically called air-cooled or water-cooled, energy storage apparatus.

The invention claimed is:

1. An energy storage apparatus comprising:
 a plurality of energy storage devices, each including an external terminal; and
 a bus bar configured to conductively connect the external terminals to each other between different ones of the plurality of energy storage devices,
 wherein
 the bus bar includes a pair of connecting portions, each placed on the external terminal,
 wherein each of the pair of connecting portions includes a plurality of curved welded portions, each formed in a curved shape that convexly curves inward in a first direction where the pair of connecting portions are aligned with each other,
 wherein the plurality of curved welded portions includes a group of curved welded portions in which the plurality of curved welded portions is aligned with each other in the first direction, and
 wherein a plurality of the groups of curved welded portions is formed in one of the pair of the connecting portions and spaced from each other in a second direction orthogonal to the first direction in the one of the pair of connecting portions.

2. The energy storage apparatus according to claim 1, wherein
 each of the plurality of curved welded portions is configured to form an open region that is open outward in the first direction, and
 the open region of a corresponding one of the curved welded portions includes at least a part of one of the curved welded portions that adjoins the corresponding one of the curved welded portions at an outer side in the first direction.

3. The energy storage apparatus according to claim 1, wherein
 the plurality of curved welded portions aligned in the first direction are discontinuous with each other.

4. The energy storage apparatus according to claim 1, wherein
 at each of the pair of connecting portions, the plurality of curved welded portions are formed in a plurality of groups, and
 the plurality of groups are formed and spaced from each other in the second direction that is orthogonal to the first direction.

5. The energy storage apparatus according to claim 1,
 wherein the plurality of energy storage devices are arranged in the first direction,
 wherein an energy storage device includes a case having a rectangular parallelepiped shape,
 wherein the case includes a first face, a second face and a third face,
 wherein a width of the first face in the second direction orthogonal to the first direction is broader than a width of the second face in the first direction,
 wherein the third face faces a third direction orthogonal to the first direction and the second direction,
 wherein the plurality of energy storage devices includes a first energy storage device and a second energy storage device adjacent to the first energy storage device,
 wherein the first energy storage device includes a first external terminal on a third face of the first energy storage device and the second energy storage device includes a second external terminal on a third face of the second energy storage device, and wherein the first external terminal is connected to the second external terminal via the bus bar.

6. The energy storage apparatus according to claim 5, wherein the plurality of curved welded portions includes a first curved welded portion and a second curved welded portion adjacent to the first curved welded portion, wherein the first curved welded portion and the second curved welded portion are formed to be aligned with each other in the first direction, wherein the first curved welded portion is configured to form an open region that is open outward in the first direction, wherein the open region is surrounded by the first curved welded portion and a straight line connecting both ends of the first curve welded portion, and wherein at least a part of the second curved welded portion is located in the open region of the first curved welded portion.

7. The energy storage apparatus according to claim 1, wherein the plurality of curved welded portions includes a first curved welded portion and a second curved welded portion adjacent to the first curved welded portion, wherein the first curved welded portion and the second curved welded portion are formed to be aligned with each other in the first direction, wherein the first curved welded portion is configured to form an open region that is open outward in the first direction, wherein the open region is surrounded by the first curved welded portion and a straight line connecting both ends of the first curve welded portion, and wherein at least a part of the second curved welded portion is located in the open region of the first curved welded portion.

8. An energy storage apparatus comprising:

a first energy storage device including a first external terminal;

a second energy storage device including a second external terminal and being adjacent to the first energy storage device in a first direction; and a bus bar configured to conductively connect the first external terminal with the second external terminal, wherein the first energy storage device and the second energy storage device include a case having a rectangular parallelepiped shape, wherein the case includes a first face, a second face and a third face, wherein a width of the first face in a second direction orthogonal to the first direction is broader than a width of the second face in the first direction, wherein the third face faces a third direction orthogonal to the first direction and the second direction, wherein the first energy storage device includes the first external terminal on the third face of the first energy storage device and the second energy storage device includes the second external terminal on the third face of the second energy storage device, wherein the bus bar includes: a first connecting portion placed on the first external terminal and connected with the first external terminal; and a second connecting portion placed on the second external terminal and connected with the second external terminal, wherein the first connecting portion includes a plurality of curved welded portions, each formed in a curved shape that convexly curves from the first connecting portion toward the second connecting portion, and wherein the plurality of curved welded portions are aligned with each other in the first direction where the first connecting portion and the second connecting portion are aligned with each other.

9. The energy storage apparatus according to claim 8, wherein each of the pair of connecting portions includes a plurality of curved welded portions, each formed in a curved shape that convexly curves inward in the first direction where the pair of connecting portions are aligned with each other, wherein the plurality of curved welded portions includes a group of curved welded portions in which the plurality of curved welded portions is aligned with each other in the first direction, and wherein a plurality of the groups of curved welded portions is formed in one of the pair of the connecting portions and spaced from each other in the second direction orthogonal to the first direction in the one of the pair of connecting portions.

10. The energy storage apparatus according to claim 9, wherein the plurality of curved welded portions includes a first curved welded portion and a second curved welded portion adjacent to the first curved welded portion, wherein the first curved welded portion and the second curved welded portion are formed to be aligned with each other in the first direction, wherein the first curved welded portion is configured to form an open region that is open outward in the first direction, wherein the open region is surrounded by the first curved welded portion and a straight line connecting both ends of the first curve welded portion, and wherein at least a part of the second curved welded portion is located in the open region of the first curved welded portion.

11. The energy storage apparatus according to claim 8, wherein the plurality of curved welded portions includes a first curved welded portion and a second curved welded portion adjacent to the first curved welded portion, wherein the first curved welded portion and the second curved welded portion are formed to be aligned with each other in the first direction, wherein the first curved welded portion is configured to form an open region that is open outward in the first direction, wherein the open region is surrounded by the first curved welded portion and a straight line connecting both ends of the first curve welded portion, and wherein at least a part of the second curved welded portion is located in the open region of the first curved welded portion.

12. The energy storage apparatus according to claim 8, wherein at each of the pair of connecting portions, the plurality of curved welded portions are formed in a plurality of groups.

13. The energy storage apparatus according to claim 8, wherein the plurality of curved welded portions are formed in a plurality of groups, and the plurality of groups are formed and spaced from each other in the second direction that is orthogonal to the first direction.

14. The energy storage apparatus according to claim 8, wherein
at each of the pair of connecting portions, the plurality of curved welded portions are formed in a plurality of groups, and
the plurality of groups are formed and spaced from each other in the second direction that is orthogonal to the first direction.

15. An energy storage apparatus comprising:
a plurality of energy storage devices, each including an external terminal; and
a bus bar configured to conductively connect the external terminals to each other between different ones of the plurality of energy storage devices,
wherein the bus bar includes a pair of connecting portions, each placed on the external terminal,
wherein each of the pair of connecting portions includes a plurality of curved welded portions, each formed in a curved shape that convexly curves inward in a first direction where the pair of connecting portions are aligned with each other,
wherein the plurality of curved welded portions includes a first curved welded portion and a second curved welded portion adjacent to the first curved welded portion,
wherein the first curved welded portion and the second curved welded portion are formed to be aligned with each other in the first direction,
wherein the first curved welded portion is configured to form an open region that is open outward in the first direction,
wherein the open region is surrounded by the first curved welded portion and a straight line connecting both ends of the first curve welded portion, and
wherein at least a part of the second curved welded portion is located in the open region of the first curved welded portion.

16. The energy storage apparatus according to claim 15,
wherein the plurality of energy storage devices are arranged in the first direction,
wherein an energy storage device includes a case having a rectangular parallelepiped shape,
wherein the case includes a first face, a second face and a third face,
wherein a width of the first face in a second direction orthogonal to the first direction is broader than a width of the second face in the first direction,
wherein the third face faces a third direction orthogonal to the first direction and the second direction,
wherein the plurality of energy storage devices includes a first energy storage device and a second energy storage device adjacent to the first energy storage device,
wherein the first energy storage device includes a first external terminal on a third face of the first energy storage device and the second energy storage device includes a second external terminal on a third face of the second energy storage device, and
wherein the first external terminal is connected to the second external terminal via the bus bar.

17. The energy storage apparatus according to claim 15, wherein
at each of the pair of connecting portions, the plurality of curved welded portions are formed in a plurality of groups spaced from each other.

18. The energy storage apparatus according to claim 15, wherein
at each of the pair of connecting portions, the plurality of curved welded portions are formed in a plurality of groups.

19. The energy storage apparatus according to claim 15, wherein
the plurality of curved welded portions are formed in a plurality of groups, and
the plurality of groups are formed and spaced from each other in a second direction that is orthogonal to the first direction.

20. The energy storage apparatus according to claim 15, wherein
at each of the pair of connecting portions, the plurality of curved welded portions are formed in a plurality of groups, and
the plurality of groups are formed and spaced from each other in a second direction that is orthogonal to the first direction.

* * * * *